US010742956B2

(12) United States Patent
Mostafavi et al.

(10) Patent No.: US 10,742,956 B2
(45) Date of Patent: Aug. 11, 2020

(54) SYSTEM AND METHOD FOR DETERMINING POSITION AND ORIENTATION OF DEPTH CAMERAS

(71) Applicant: Varian Medical Systems, Inc., Palo Alto, CA (US)

(72) Inventors: Hassan Mostafavi, Los Altos, CA (US); Andrew G. Jeung, Mountain View, CA (US); Alexander Sloutsky, Burlingame, CA (US); David H. Humber, Los Gatos, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 852 days.

(21) Appl. No.: 15/245,713

(22) Filed: Aug. 24, 2016

(65) Prior Publication Data

US 2018/0061036 A1     Mar. 1, 2018

(51) Int. Cl.
| | |
|---|---|
| *H04N 13/204* | (2018.01) |
| *H04N 5/247* | (2006.01) |
| *H04N 5/222* | (2006.01) |
| *G06T 7/70* | (2017.01) |
| *H04N 5/33* | (2006.01) |

(52) U.S. Cl.
CPC ............ *H04N 13/204* (2018.05); *G06T 7/70* (2017.01); *H04N 5/2226* (2013.01); *H04N 5/247* (2013.01); *G06T 2207/30244* (2013.01); *H04N 5/33* (2013.01)

(58) Field of Classification Search
USPC .......................................... 348/46
See application file for complete search history.

(56) References Cited

U.S. PATENT DOCUMENTS

| | | | |
|---|---|---|---|
| 2003/0063292 A1* | 4/2003 | Mostafavi | A61B 6/463 356/614 |
| 2008/0095416 A1* | 4/2008 | Jeung | A61B 90/36 382/128 |
| 2014/0270365 A1* | 9/2014 | Mostafavi | A61B 6/52 382/103 |
| 2017/0000675 A1* | 1/2017 | Hight | A61B 6/0421 |
| 2018/0345040 A1* | 12/2018 | Meir | G06T 7/85 |

\* cited by examiner

*Primary Examiner* — Christopher S Kelley
*Assistant Examiner* — Ana Picon-Feliciano
(74) *Attorney, Agent, or Firm* — Vista IP Law Group, LLP

(57) ABSTRACT

A system for determining positional information of a camera, includes: a plane determination module configured to determine a first plane and a second plane based on a depth image; a plane-association module configured to associate the first plane determined by the plane determination module with a first tool-plane, and to associate the second plane determined by the plane determination module with a second tool-plane, the first and second tool-planes having known positional relationship with respect to each other; and a positional determination unit configured to determine the positional information of the camera based on an output from the plane-association module.

30 Claims, 10 Drawing Sheets

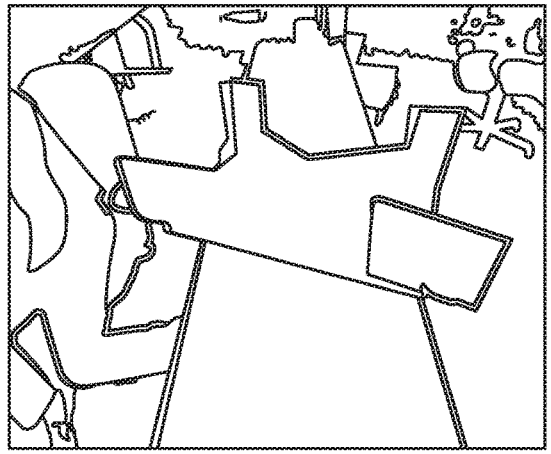
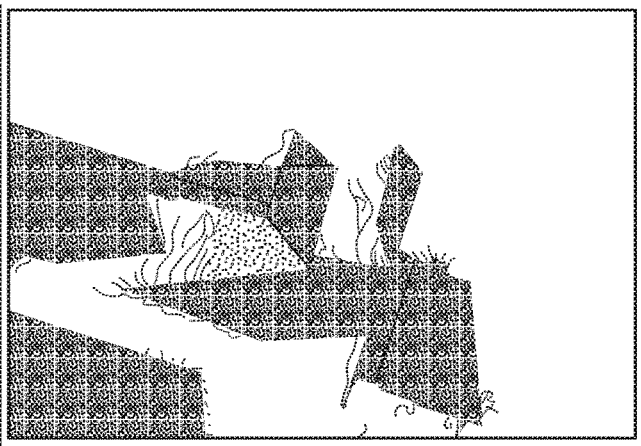
FIG. 7    FIG. 8
Detection of Planar Segments in a Scene
- Plane: a x + b y + c z + d = 0
- In homogenous coordinates: P = [a b c d]
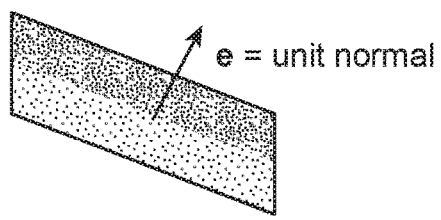
e = unit normal
- Normalization: a, b, c = unit normal components
  => d = distance to origin
- For all p-lets detected by 7X7 kernel
- Form 3D histogram: az & el of e plus d
FIG. 9A

SYSTEM AND METHOD FOR DETERMINING POSITION AND ORIENTATION OF DEPTH CAMERAS

FIELD

The field of the application relates to systems and methods for determining position and orientation of cameras, and more specifically, to systems and methods for determining position and orientation of depth cameras.

BACKGROUND

Radiation therapy involves medical procedures that selectively expose certain areas of a human body, such as cancerous tumors, to high doses of radiation. The intent of the radiation therapy is to irradiate the targeted biological tissue such that the harmful tissue is destroyed. During a radiation therapy, a radiation source may be rotated around a patient to deliver radiation from different angles at target region inside the patient. The radiation source may be mounted on an arm or a ring gantry. In certain radiation therapy, the patient support supporting the patient may also be moved. Despite careful treatment planning, during a medical procedure, a collision may occur between a moving part of a medical device and a patient. For example, the gantry of the radiation machine and the patient may possibly collide during radiation therapy. As the dose delivery plans become more complex, the combination of a rotating gantry during treatment and couch movement for non-coplanar beams delivery increases the chance of collisions.

One technique to avoid collision between the patient and the radiation machine is to use a depth camera, which detects the surface of the patient. The detected surface forms a model representing the object that is desired to be protected. The model may then be used to monitor a proximity of components of the radiation machine relative to a boundary of the model to determine if a collision is imminent.

Systems and methods for accurately determining the position and orientation of a depth camera relative to a certain coordinate system are described herein. By accurately determining the position and orientation of the depth camera, information derived from the depth camera can then be transformed accurately to a desired coordinate system.

SUMMARY

A system for determining positional information of a camera, includes: an input configured to receive a depth image and/or data derived from the depth image; a plane determination module configured to determine a first plane and a second plane based on the depth image; a plane-association module configured to associate the first plane determined by the plane determination module with a first tool-plane, and to associate the second plane determined by the plane determination module with a second tool-plane, the first and second tool-planes having known positional relationship with respect to each other; and a positional determination unit configured to determine the positional information of the camera based on an output from the plane-association module.

Optionally, the system further includes a non-transitory medium for storing the depth image and/or data derived from the depth image.

Optionally, the plane determination module comprises a plane detection module configured to detect a plurality of sub-planes, and a histogram module configured to form a histogram of coefficients for the sub-planes.

Optionally, the plane determination module further comprises a peak identification module configured to identify a first peak and a second peak in the histogram, the first peak corresponding with the first plane, the second peak corresponding with the second plane.

Optionally, the peak identification module is also configured to identify a third peak in the histogram, the third peak corresponding with a third plane.

Optionally, the plane determination module is configured to determine the first plane using a principal component analysis or a pseudo-inverse method.

Optionally, the plane-association module is configured to perform a direct linear transform or a Gauss iterative method.

Optionally, the plane determination module is also configured to determine a third plane, and wherein the system further comprises a corner detection module configured to determine an intersection of the first, second, and third planes.

Optionally, the positional information comprises a coordinate of the camera, an orientation of the camera, or a combination of both.

Optionally, the camera is attached to a moving part of a medical device.

A method for determining positional information of a camera, includes: determining, using a plane determination module, a first plane and a second plane based on a depth image; associating, using a plane-association module, the first plane determined by the plane determination module with a first tool-plane; associating the second plane determined by the plane determination module with a second tool-plane, the first and second tool-planes having known positional relationship with respect to each other; and determining, using a positional determination unit, the positional information of the camera based on an output from the plane-association module.

Optionally, the method further includes storing the depth image and/or data derived from the depth image in a non-transitory medium.

Optionally, the method further includes: detecting a plurality of sub-planes; and forming a histogram of coefficients for the sub-planes.

Optionally, the method further includes identifying a first peak and a second peak in the histogram, the first peak corresponding with the first plane, the second peak corresponding with the second plane.

Optionally, the method further includes identifying a third peak in the histogram, the third peak corresponding with a third plane.

Optionally, the first plane is determined using a principal component analysis or a pseudo-inverse method.

Optionally, the acts of associating comprise performing a direct linear transform or a Gauss iterative method.

Optionally, the method further includes determining a third plane, wherein the method further comprises determining an intersection of the first, second, and third planes.

Optionally, the positional information comprises a coordinate of the camera, an orientation of the camera, or a combination of both.

Optionally, the first tool-plane corresponds with a first planar structure, and the second tool plane corresponds with a second planar structure, and wherein the first planar structure and the second planar structure are mounted to a supporting base.

Optionally, the first tool-plane corresponds with a planar structure when the planar structure is at a first position, and the second tool-plane corresponds with the planar structure when the planar structure is at a second position.

Optionally, the method further includes moving the planar structure from the first position to the second position.

Optionally, the planar structure is coupled to a patient support, and wherein the act of moving the planar structure comprises translating the patient support, rotating the patient support, or both.

Optionally, the camera is attached to a moving part of a medical device.

A marker block for use with a depth sensing camera, includes: a supporting base; a first planar structure connected to the supporting base; a second planar structure connected to the supporting base, wherein the second planar structure is spaced apart from the first planar structure; and a third planar structure connected to the supporting base; wherein the first planar structure has a first orientation, the second planar structure has a second orientation, and the third planar structure has a third orientation, the first, second, and third orientations being different from each other.

Optionally, the third planar structure is spaced apart from the first and second planar structures.

Optionally, marker block further includes a fourth planar structure, wherein the fourth planar structure has a fourth orientation that is different from the first, second, and third orientations.

Optionally, the first planar structure has a first edge, and the second planar structure has a second edge that is spaced apart from the first edge of the first planar structure.

Optionally, the first planar structure has a surface area that is at least 1 square foot.

Optionally, the first planar structure and the second planar structure are spaced apart from each other by a distance that is at least 12 inches.

Other and further aspects and features will be evident from reading the following detailed description.

DESCRIPTION OF THE DRAWINGS

The drawings illustrate the design and utility of embodiments, in which similar elements are referred to by common reference numerals. These drawings are not necessarily drawn to scale. In order to better appreciate how the above-recited features, other advantages, and objects are obtained, a more particular description of the embodiments will be rendered, which are illustrated in the accompanying drawings. These drawings depict only exemplary embodiments and are not therefore to be considered limiting in the scope of the claims.

FIG. 7 illustrates an example of a depth image.

FIG. 8 illustrates another example of a depth image.

FIG. 9A illustrates various parameters associated with plane detection.

DETAILED DESCRIPTION

Figure 1:
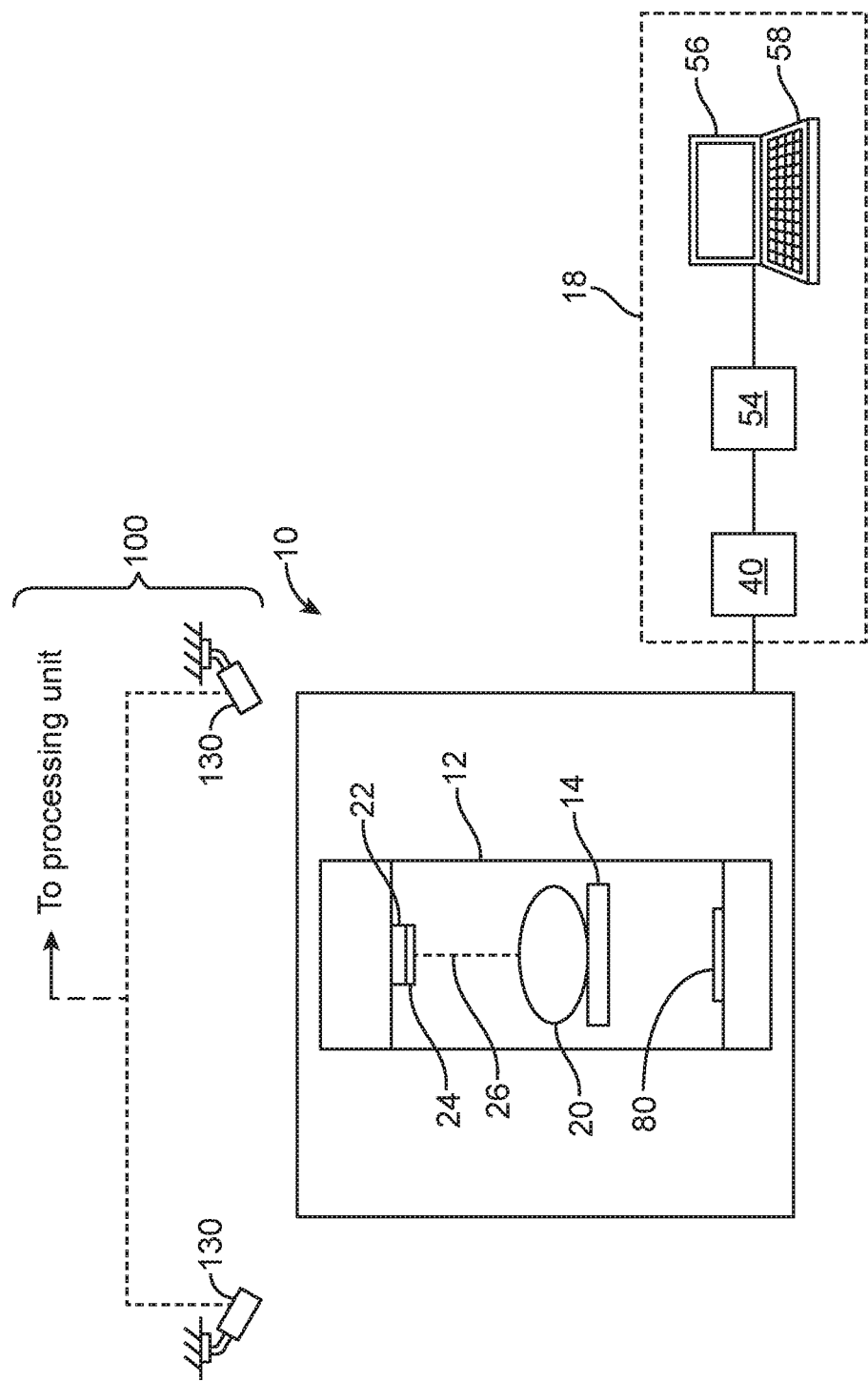
FIG. 1 illustrates a radiation treatment system with a collision avoidance system configured for detecting possible collision between a moving part of a medical device and a patient during a medical procedure in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a radiation treatment system 10. The system 10 includes an arm gantry 12, a patient support 14 for supporting a patient 20, and a control system 18 for controlling an operation of the gantry 12 and delivery of radiation. The system 10 also includes a radiation source 22 that projects a beam 26 of radiation towards the patient 20 while the patient 20 is supported on support 14, and a collimator system 24 for changing a cross sectional shape of the radiation beam 26. The radiation source 22 may be configured to generate a cone beam, a fan beam, or other types of radiation beams in different embodiments. Also, in other embodiments, the source 22 may be configured to generate proton beam, electron beam, or neutron beam, as a form of radiation for treatment purpose. Also, in other embodiments, the system 10 may have other form and/or configuration. For example, in other embodiments, instead of an arm gantry 12, the system 10 may have a ring gantry 12.

In the illustrated embodiments, the radiation source 22 is a treatment radiation source for providing treatment energy. In other embodiments, in addition to being a treatment radiation source, the radiation source 22 can also be a diagnostic radiation source for providing diagnostic energy for imaging purpose. In such cases, the system 10 will include an imager, such as the imager 80, located at an operative position relative to the source 22 (e.g., under the support 14). In further embodiments, the radiation source 22 may be a treatment radiation source for providing treatment energy, wherein the treatment energy may be used to obtain images. In such cases, in order to obtain imaging using treatment energies, the imager 80 is configured to generate images in response to radiation having treatment energies (e.g., MV imager). In some embodiments, the treatment energy is generally those energies of 160 kilo-electron-volts (keV) or greater, and more typically 1 mega-electron-volts (MeV) or greater, and diagnostic energy is generally those energies below the high energy range, and more typically below 160 keV. In other embodiments, the treatment energy and the diagnostic energy can have other energy levels, and refer to energies that are used for treatment and diagnostic purposes, respectively. In some embodiments, the radiation source 22 is able to generate X-ray radiation at a plurality of photon energy levels within a range anywhere between approximately 10 keV and approximately 20 MeV. In further embodiments, the radiation source 22 can be a diagnostic radiation source. In such cases, the system 10 may be a diagnostic system with one or more moving parts. In the illustrated embodiments, the radiation source 22 is carried by the arm gantry 12. Alternatively, the radiation source 22 may be located within a bore (e.g., coupled to a ring gantry).

In the illustrated embodiments, the control system 18 includes a processing unit 54, such as a processor, coupled to a control 40. The control system 18 may also include a monitor 56 for displaying data and an input device 58, such as a keyboard or a mouse, for inputting data. The operation of the radiation source 22 and the gantry 12 are controlled by the control 40, which provides power and timing signals to the radiation source 22, and controls a rotational speed and position of the gantry 12, based on signals received from the processing unit 54. Although the control 40 is shown as a separate component from the gantry 12 and the processing unit 54, in alternative embodiments, the control 40 can be a part of the gantry 12 or the processing unit 54.

In some embodiments, the system 10 may be a treatment system configured to deliver treatment radiation beam towards the patient 20 at different gantry angles. During a treatment procedure, the source 22 rotates around the patient 20 and delivers treatment radiation beam from different gantry angles towards the patient 20. While the source 22 is at different gantry angles, the collimator 24 is operated to change the shape of the beam to correspond with a shape of the target tissue structure. For example, the collimator 24 may be operated so that the shape of the beam is similar to a cross sectional shape of the target tissue structure. In another example, the collimator 24 may be operated so that different portions of the target tissue structure receive different amount of radiation (as in an IMRT procedure).

Figure 2:
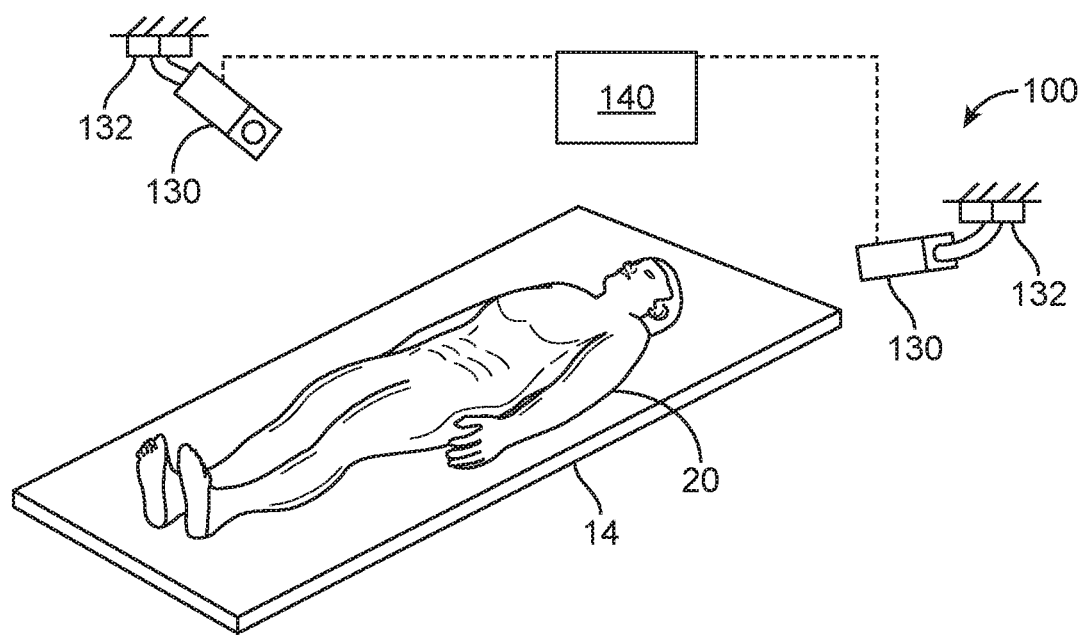
FIG. 2 illustrates a system for determining whether there is a possible collision between a patient and an object.

As shown in FIGS. 1 and 2, the medical system 10 also includes a collision avoidance system 100, which includes two depth measuring cameras 130, and a securing mechanism 132 for securing the depth measuring camera 130 relative to an object (e.g., a wall, a ceiling, a floor, a stand, or any of the components in the system 10, such as the gantry 12, the patient support 14, etc.).

Each depth sensing camera 130 is configured to sense depths and to generate signals representing the depths. The depth sensing camera 130 is configured to provide a two dimensional image, wherein each pixel in the two dimensional image represents a distance from a reference location (e.g., from the camera 130). In some embodiments, the depth sensing camera 130 may use structured light for depth measurement (e.g., a Kinect camera). In other embodiments, the depth sensing camera 130 may use time-of-flight method for depth measurement (e.g., Mesa SR4000, or the new Microsoft Kinect2 camera). In further embodiments, the depth sensing camera 130 may be any device that is capable of sensing depth using any known techniques. It should be noted that the term "camera", as used in this specification, may be any device, and should not be limited to a device that provides "image" signals. For example, in some embodiments, the depth sensing camera 130 may be configured to provide depth signals, which may or may not be considered image signals, regardless of whether such depth signals are displayed in image form or not. A depth signal may be any signal indicating a depth or distance, or any signal from with a depth or distance may be derived. Also, a depth signal of an object may include one or more values (e.g., depth values, etc.) for one or more respective portions of the object. For example, a depth signal may include one or more pixel values of an image, which contain depth information for different parts of the object. By means of non-limiting examples, the signal may be an infrared signal, an ultra-sound signal, etc. In some embodiments, the dimensions of the depth sensing camera 130 may be small enough to be non-intrusive to the treatment process when mounted during use. For example, in some embodiments, the camera 130 may have a dimension of 11 inch×2.5 inch×1.5 inch. In other embodiments, the camera 130 may have other dimensions, such as those larger or smaller than the example provided above, as long as the use of the camera 130 does not interfere with the treatment procedure.

Also, in further embodiments, the camera 130 may be other types of depth sensing camera. For example, the camera 130 may be a stereoscopic camera with/without illumination, a stereoscopic camera with a projected pattern, or a stereoscopic camera with structured light. Also, in some embodiments, the collision avoidance system 100 may include multiple (e.g., two, three, etc.) stereoscopic cameras. In one implementation, each stereoscopic camera may be an alignRT camera from VisionRT.

Figure 3:
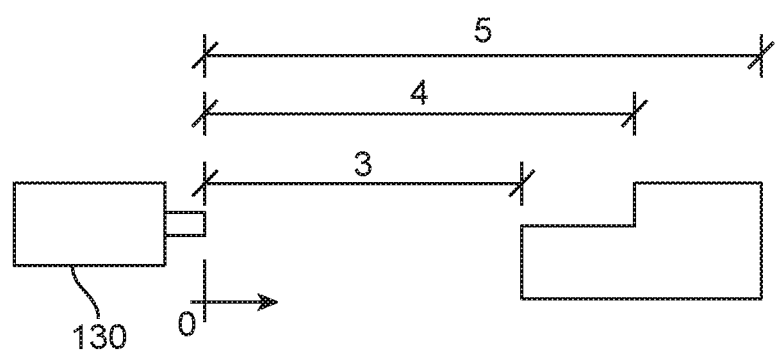
FIG. 3 illustrates a time-of-flight technique used by a depth sensing camera.

Because the depth sensing camera 130 is configured to sense depth, the two-dimensional image it produces has an array of pixel values that indicate respective distances between the camera 130 (i.e., the sensors in the camera 130) and different objects (or different parts of an object). For example, as shown in FIG. 3, an arbitrary origin may be set to be at the camera, and so an object that is further away from the camera 130 will have a corresponding sensed depth by the camera 130 that has a higher value than another object that is closer to the camera 130. Thus, a pixel with a smaller value indicates that the sensed object is closer to the depth sensing camera 130 compared to a pixel that has a larger value.

Also, in some embodiments, the depth sensing camera 130 may be infrared-based, in which cases, the depth may be sensed by the camera 130 using infrared. In some embodiments, such depth sensing camera 130 may be configured to output infrared video images from which depth images are formed. In some embodiments, these infrared video images may have exactly the same field of view as the depth images. Thus, the infrared video images may be used together with the depth images to determine whether there is a possible collision.

Furthermore, in some embodiments, the depth sensing camera 130 may include an infrared emitter, a color sensor, and an infrared depth sensor. The infrared depth sensor is configured to sense depth based on infrared signals output by the infrared emitter. The color sensor is configured to sense visible image.

In some embodiments, the depth sensing camera 130 may have a detection (or frame) rate of 30 per second or higher. In other embodiments, the detection/frame rate may be less than 30 per second.

In some embodiments, the securing mechanism 132 may be configured to secure the depth measuring camera 130 to a part of the medical system 10, or to a structure that is not a part of the medical system 10. The securing mechanism 132 may be a clamp for grasping an object, a screw for insertion into a screw slot located in an object to which the depth measuring camera 130 is to be secured against, a snap-and-fit type connector, a hook-and-loop type connector, or any of other types of securing mechanism. In still further embodiments, the securing mechanism 132 is not required, and the collision avoidance system 100 does not include the securing mechanism 132. For example, in other embodiments, the support 134 may be a base, and the base may be placed on a flat surface that supports the depth sensing camera 130 during use.

Also, in some embodiments, the depth sensing camera 130 may be moveably coupled to the securing mechanism 132. For example, the depth sensing camera 130 may be coupled to the securing mechanism 132 via a support (not shown). The support may be a post, a bracket, a beam, an arm, etc., for supporting the depth sensing camera 130. The securing mechanism 132 may be located at the support. Also, in some embodiments, the support may optionally have one or more moveable parts to allow a position and/or an orientation of the depth sensing camera 130 to be adjusted. In some embodiments, a first part of the support may be movable relative to a second part of the support in order to adjust the camera position (e.g., in a linear direction and/or in a rotation). For example, the first part and the second part of the support may be implemented using a telescopic arm. As another example, the first part of the support may be rotatably coupled to the second part of the support via a hinge or a ball socket. In further embodiments, the support may be a base with a tilt motor, which allows the camera 130 to be tilted in one, two, or three, degrees of movement relative to the base. In other embodiments, the support is not needed, and the collision avoidance system 1000 may not include the support.

Although two depth cameras 130 are shown in the illustrated embodiments, in other cases, the collision avoidance system 100 may include only a single depth sensing camera 130, or more than two depth sensing cameras 130. For example, in other embodiments, there may be one or more additional depth sensing cameras 130 pointing at different parts of the treatment system 10.

As shown in FIG. 2, the collision avoidance system 100 also includes a processing unit 140 communicatively coupled to the depth sensing camera 130. The processing unit 140 is configured to process signals transmitted from the depth sensing camera 130, and to determine whether there is a possible collision between the patient and an object based on the signals. In some embodiments, the processing unit 140 may be a processor, such as an ASIC processor, a FPGA processor, a general purpose processor, or any of other types of processor. Also, the processing unit 140 may include hardware, software, or combination of both. Also, in some embodiments, the processing unit 140 may be the same as the processing unit 54, or a component of the processing unit 54. In other embodiments, the processing unit 140 may be considered to be a part of the treatment system 10, and not a part of the collision avoidance system 100.

Figure 4:
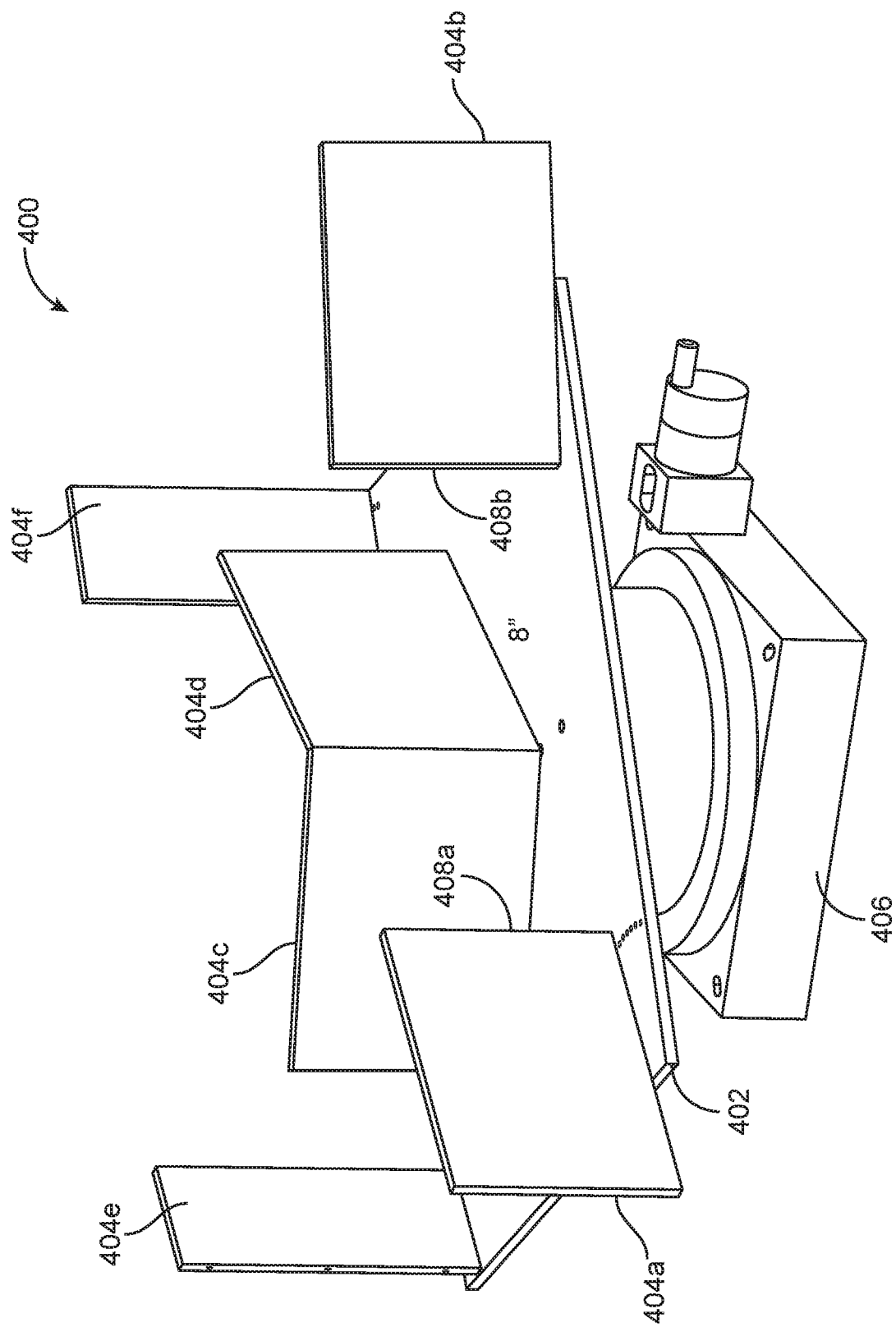
FIG. 4 illustrates an example of a marker block for calibrating a depth camera.

FIG. 4 illustrates a marker block 400 that may be used to calibrate (e.g., determine positional information for) the depth sensing cameras 130. The marker block 400 has a supporting base 402, and a plurality of planar structures 404a-404f connected to the supporting base 402. In some cases, the planar structures 404 may be detachably secured to the supporting base 402. In other cases, the planar structures 404 may be permanently secured to the supporting base 402. Also, in some embodiments, one or more of the planar structures 404 may have position(s) and/or orientation(s) that is adjustable with respect to the supporting base 402.

As shown in the figure, the marker block 400 has a first planar structure 404a, and a second planar structure 404b that is spaced apart from the first planar structure 404a. The marker block 400 also has a third planar structure 404c. Also, the first planar structure 404a has a first orientation, the second planar structure 404b has a second orientation, and the third planar structure 404c has a third orientation, the first, second, and third orientations being different from each other. The third planar structure 404c is spaced apart from the first and second planar structures 404a, 404b.

In the illustrated embodiments, the marker block 400 further includes a fourth planar structure 404d, wherein the fourth planar structure 404d has a fourth orientation that is different from the first, second, and third orientations. The marker block 400 further includes a fifth planar structure 404e, and a sixth planar structure 404f. The orientations of the planar structures 404a-404f are all different with respect to each other.

In some cases, the first planar structure 404a has a surface area that is at least 1 square foot. This dimension allows the planar structure 404 to be identified more easily among other objects that are not parts of the marker block 400. In other cases, the first planar structure 404a may have a surface area that is less than 1 square foot. The same goes for the other planar structures 404.

In addition, in some cases, the first planar structure 404a and the second planar structure 404b are spaced apart from each other by a distance that is at least 12 inches. This spacing allows the calibration of the depth sensing camera 130 to be performed more accurately. In other cases, the spacing between the first planar structure 404a and the second planar structure 404b may be less than 12 inches. The same goes for the other planar structures 404.

As shown in the figure, the marker block 400 further optionally includes a mounting base 406 configured for mounting to an object (e.g., a patient support, a wall, a ceiling, a post, etc.). The supporting base 402 may be fixedly secured to the mounting base 406, or may be moveably secured to the mounting base 406. For example, the supporting base 402 may be rotatably secured to the mounting base 406, which allows an orientation of the supporting base 402 (together with the planar structures 404) to be adjusted relative to the mounting base 406. This, in turn, allows the orientations of the planar structures 404 relative to a depth camera (that is oriented to view the marker block 400) to be adjusted. In some cases, the mounting base may be considered to be a component of the supporting base 402.

In the above embodiments, the marker block 400 is illustrated as having six planar structures 404a-404f. In other embodiments, the marker block 400 may have fewer than six planar structures 404. For example, the marker block 400 may have only three, four, or five planar structures 404 attached to the supporting base 402. Also, in other embodiments, the marker block 400 may have more than six planar structures 404. It should be noted that a minimum of three planar structures 404 are desired so that the position (x, y, z) and orientation ($\theta_x$, $\theta_y$, $\theta_z$) of the marker block 400 can be determined. Any additional planar structure(s) 404 beyond three is advantageous because it can be used to provide a redundancy for checking the determined position and orientation of the marker block 400.

As shown in the figure, the first planar structure 404a has a first edge 408a, and the second planar structure 404b has a second edge 408b that is spaced apart from the first edge 408a of the first planar structure 404a. This configuration provides a relatively lighter marker block 400 because the planar structures 404 do not need to be extended to join each other on their edges, thereby eliminating excess materials. In other cases, two or more of the planar structures 404 may be secured to each other on their edges (like planar structures 404c, 404d).

In the above description, the planar structures 404a-404f are described as first, second, third, fourth, fifth, and sixth planar structures, respectively. However, it should be noted that the terms "first", "second", "third", etc. are used herein to refer to different items, and that they do not refer to order of things, unless specifically indicated otherwise. In other cases, any of the planar structures 404a-404f may be referred to as any of first, second, third, fourth, fifth, and sixth planar structures.

Furthermore, in other embodiments, a planar structure may be a part of an object, which may or may not have any planar form. For example, the marker block 400 may have a block-like configuration, and the planar structure 404a may be an exterior portion of the block-like marker block 400. The same goes for the other planar structures 404a-404f.

Figure 5:
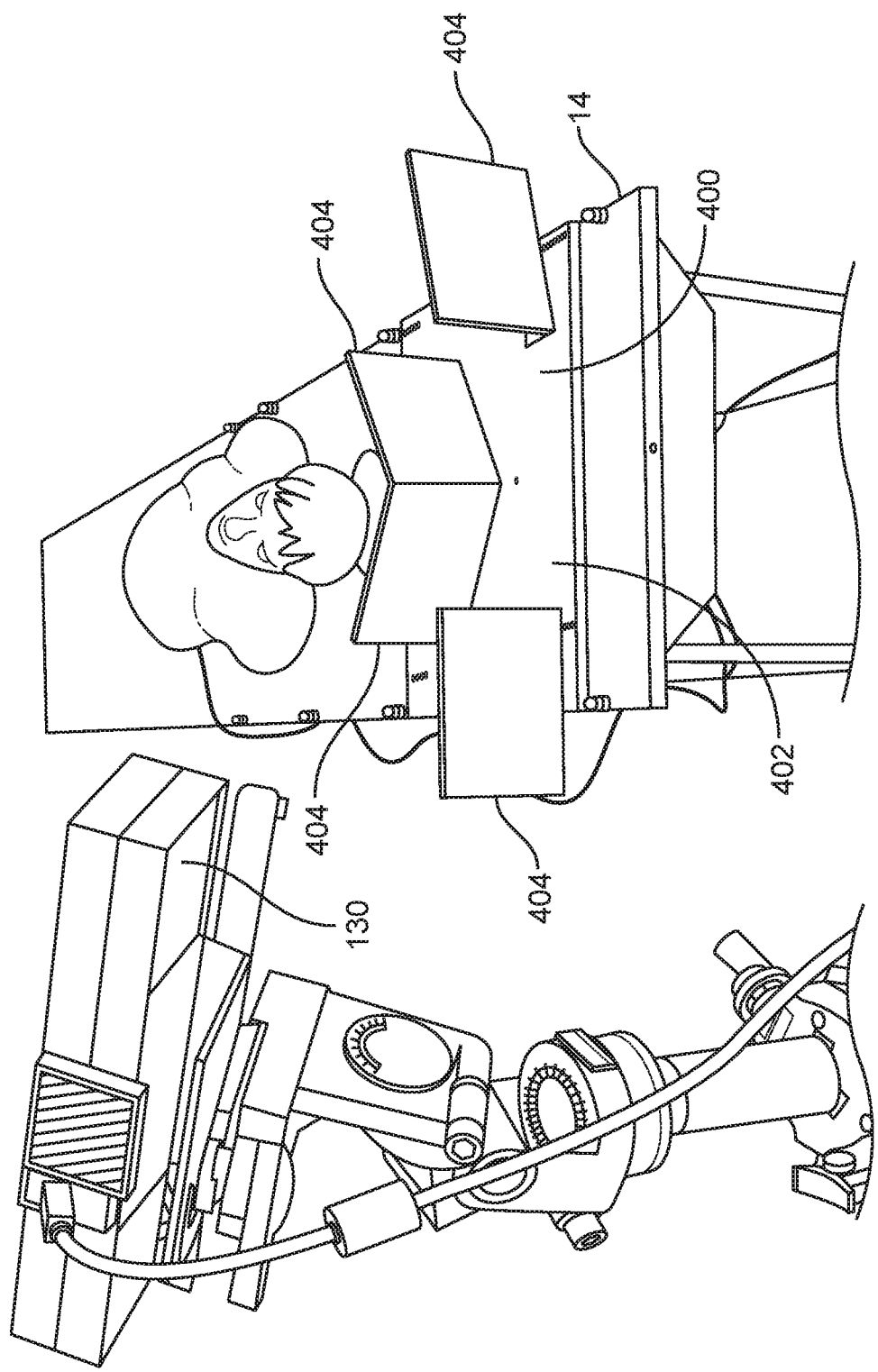
FIG. 5 illustrates the marker block of FIG. 4 being used with a depth camera.

During use of the marker block 400, the marker block 400 is mounted to an object, such as the patient support 14, so that the depth sensing camera 130 can view the marker block 400. FIG. 5 illustrates a setup that involves the marker block 400. As shown in the figure, the marker block 400 is mounted to the patient support 14, while the depth sensing camera 130 is oriented to view the different planar structures 404 at the marker block 400. In the illustrated embodiments, the planar structures 404 have different orientations with respect to the depth sensing camera 130.

Figure 6A:
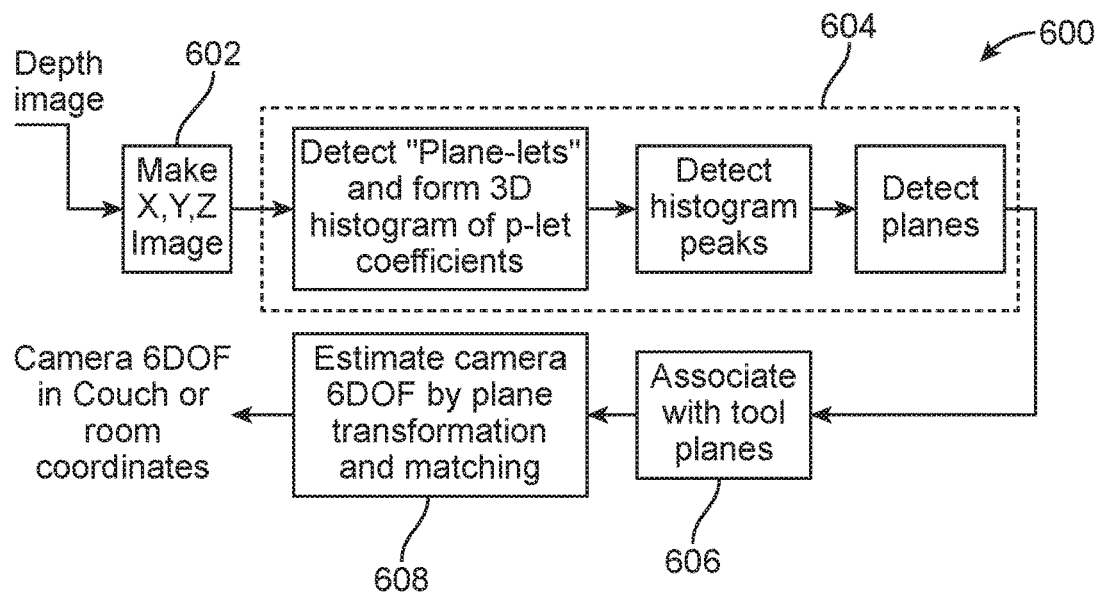
FIG. 6A illustrates a method for determining positional information of a depth camera.
Figure 6B:
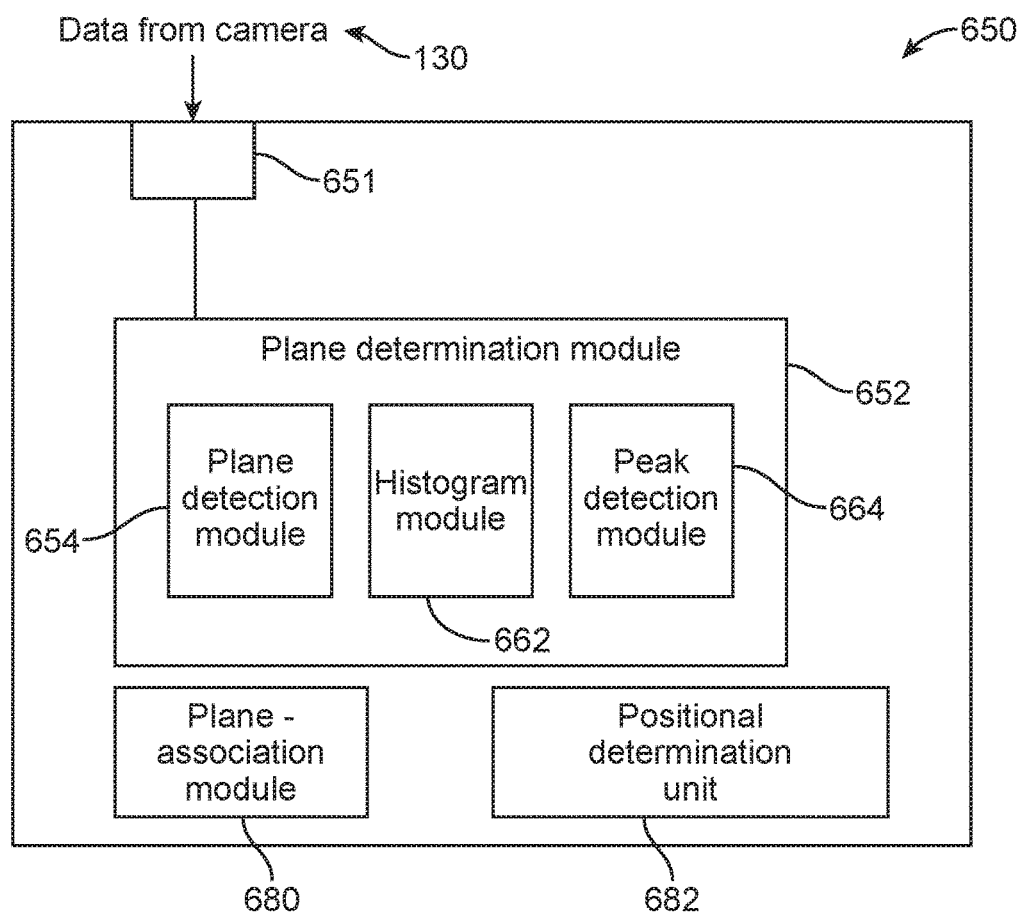
FIG. 6B illustrates a system for determining positional information of a depth camera.

FIG. 6A illustrates a method 600 for determining positional information of a depth sensing camera in accordance with some embodiments. The method 600 may be performed by a system 650 that is configured to determine positional information of a depth sensing camera, like that shown in FIG. 6B. Referring to FIGS. 6A and 6B, first, a depth image is obtained (item 602). In some embodiments, item 602 may be performed by the system 650 with an input 651 that receives the depth image from the depth sensing camera 130. In other embodiments, item 602 may be performed by the system 650, which receives data from the depth sensing camera 130, and then calculates values to form a depth image. In some cases, the depth sensing camera 130 may be configured to output depth data (e.g., z values), and the system 650 may be configured to determine x, y values for each of the z values. The derived data set (x, y, z) constitutes a point cloud that may be stored in a non-transitory medium. In some cases, the data (e.g., depth image, or data that can be used to derive a depth image) from the depth sensing camera 130 may be stored in the non-transitory medium.

Accordingly, in some embodiments, the system 650 does not need to calculate x, y values for each of the z values. Instead, the depth sensing camera 130 is configured to output the data set (x, y, z) for processing by the system 650. In other embodiments, the depth sensing camera 130 outputs z values for processing by the system 650. In some cases, the set of depth values z output by the depth sensing camera 130 may be considered an example of a depth image. Alternatively, the set of values (x, y, z) may also be considered as another example of a depth image.

FIG. 7 illustrates an example of a depth image that may be output from the depth sensing camera 130, and received by the system 650. FIG. 8 illustrates another example of a depth image that may be output from the depth sensing camera 130, and received by the system 650. Alternatively, the image in FIG. 8 may be derived using data obtained from the depth sensing camera 130.

Returning to FIG. 6A, next, a plurality of planes is determined based on the depth image (item 604). In the illustrated embodiments, the system 650 may include a plane determination module 652 configured to determine the plurality of planes (e.g., a first plane and a second plane). In particular, the plane determination module 652 analyzes the depth image to identify multiple planes associated with the surfaces of the planar structures 404 of the marker block 400. Because the depth sensing camera 130 is aimed towards the marker block 400, the depth sensing camera 130 will detect the surfaces (e.g., rectilinear surfaces) of the planar surfaces 404 at the marker block 400. As a result, the depth image will have depth values corresponding with the planes of the surfaces of the planar structures 404 at the marker block 400. The plane determination module 654 is configured to detect these planes.

Various techniques may be employed by the plane determination module 652 to detect the planes of the planar structures 404 from the depth image. In some embodiments, the plane determination module 652 includes a plane detection module 654 configured to detect a plurality of sub-planes from a depth image. The plane determination module 652 may also include a histogram module 662 configured to form a histogram of coefficients for the sub-planes, and a peck detection module 664 configured to identify multiple peaks (e.g., a first peak, a second peak, etc.) in the histogram.

During use, the plane detection module 654 analyzes different regions from the depth image to detect planar surfaces (e.g., rectilinear planar surfaces). Because at least three points can form a plane, the plane detection module 600 may be configured examine different sets of three or more points in the depth image to detect different sub-planes. As shown in FIG. 9A, each plane (e.g., sub-plane) detected by the plane detection module 654 may be represented by the plane equation $ax+by+cz+d=0$. Each detected plane has a normal that is perpendicular to the plane, and that can be represented by the coefficients. Accordingly, for each detected plane, a set of coefficients [a, b, c, d] may be determined by the plane detection module 654, and the coefficients may be stored in a non-transitory medium for further processing. In one implementation, the plane detection module 654 may utilize a moving window to analyze different regions in the depth image to detect multiple sub-planes. For example, the moving window may comprise a 3×3 kernel, a 4×4 kernel, a 5×5 kernel, a 6×6 kernel, a 7×7 kernel, or other kernel having other sizes. The plane detection module 654 may utilize such moving window and may analyze different sets of pixels in different respective parts of the depth image until all of the pixels have been analyzed. As a result of such analysis, the plane detection module 654 will generate multiple sets of coefficients [a, b, c, d] representing all of the detecting sub-planes (e.g., their respective normal), respectively.

In the embodiments shown in FIG. 9A, the first three plane coefficients a, b, and c specify the orientation of the plane, by specifying the direction of a three dimensional vector that is exactly perpendicular to the plane. Note that this is orientation and not location. There are a potentially infinite set of parallel planes which have the same orientation and share the same perpendicular vector, but are not at the same location. The d coefficient is used to specify the position. d=0 means that the plane passes through the origin of coordinates. d=1 means that the plane's closest point to the origin is 1 cm away, and so on. Using all four coefficients allows us to specify any plane uniquely, both in orientation and location. Also, in the figure, "e" is used to designate the three dimensional perpendicular vector with components a, b, and c. The azimuth and elevation angles of the plane (i.e. Its orientation) are specified by e. In some cases, histogram(s) of the various variables (e.g., a, b, c, d, azimuth and elevation angles, etc.) associated with the different detected planes may be formed by the system 650.

Figure 9B:
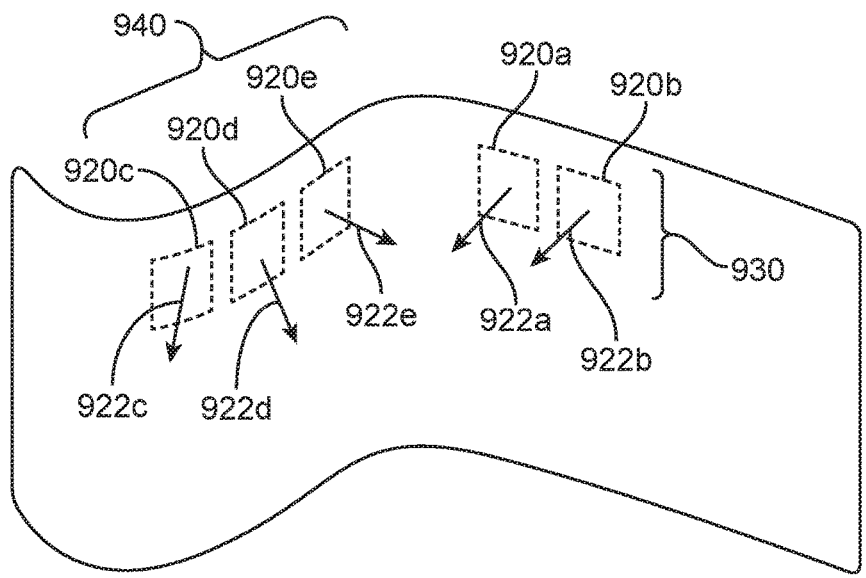
FIG. 9B illustrates detection of sub-planes, and using normals of the sub-planes to identify a planar surface in a region of a depth image.

The above concept is graphically shown in FIG. 9B. FIG. 9B illustrates an example of a surface in a depth image, particularly showing the different sub-planes 920a-920e detected by the plane detection module 654 and their respective normals 922a-922e. As shown in the figure, the plane detection module 654 detects two sub-planes 920a, 920b in two respective neighboring regions of the depth image. The two sub-planes 920a, 920b have respective normal 922a, 922b with the same orientation. Accordingly, the plane determination module 652 can then determine that there is a rectilinear (flat) plane in the region 930 based on the multiple sub-planes 920a, 920b (with the same normal orientation) in that region 930. On the other hand, the sub-planes 920c-920e have respective normals 922c-922e with different orientations. Accordingly, the plane determination module 652 can then determine that there is no rectilinear plane in the region 940. Instead, the region 940 in the depth image has a curvilinear plane in the region 940.

The histogram module 662 is configured to form a histogram of coefficients for the sub-planes. In particular, after the plane detection module 654 generates the coefficients (for the detected sub-planes), the histogram module 662 gathers the coefficients, organizes them, and uses them to form a histogram. If a certain set of coefficients has a high count, that means the plane detection module 654 detects many sub-planes in a region having respective normal with the same orientation. In such cases, the plane determination module may then determine that there is a rectilinear planar surface in that region. The peck detection module 664 is configured to identify multiple peaks (e.g., a first peak, a second peak, etc.) in the histogram. Because the depth image of the marker block 400 will have images of the different planar structures 404, the histogram will have multiple peaks that correspond with the surfaces of those respective planar structures. For example, there may be a first peak corresponding with a first determined plane for the first planar structure 404a, a second peak corresponding with a second determined plane for the second planar structure 404b, and a third peak corresponding with a third determined plane for the third planar structure 404c.

It should be noted that the technique for determining the planes of the planar structures 404 in the depth image is not limited to the example described. In other embodiments, the planes (e.g., first plane, second plane, etc.) may be determined by the plane determination module 652 using a principal component analysis. In further embodiments, the planes may be determined by the plane determination module 652 using a pseudo-inverse method. Other techniques for determining the planes may be used by the plane determination module 652 in other embodiments.

Return to FIG. 6A, next, the planes determined by the plane determination module 652 is associated with respective tool-planes of the planar structures 404 of the marker block 400 (item 606). For example, a first plane determined by the plane determination module 652 is associated with a first tool-plane of the first planar structure 404a, the second plane determined by the plane determination module 652 is associated with a second tool-plane of the second planar structure 404b, and the third plane determined by the plane determination module 652 is associated with a third tool plane of the third planar structure 404c. In some cases, item 606 may be performed by a plane-association module 680 (shown in FIG. 6B).

In the illustrated embodiments, the tool-planes of the planar structures 404 at the marker block 400 have known positional relationship with respect to each other. For example, the relative positions among the planar structures 404, and the relative orientations among the planar structures 404 are known. The relative positional information of the tool-planes may be input to the system 650 and may be stored in a non-transitory medium. During use, the plane-association module 680 retrieves the positional information of the tool-planes from the non-transitory medium. The plane-association module 680 then analyzes the planes determined by the plane determination module 652 to find a best match against the tool-planes of the marker block 400 based on the known positional information of the tool-planes. Once the match has been found, the positional information (position (e.g., x, y, z coordinate) and/or orientation) of the marker block 400 can then be determined. The positional information of the marker block 400 may be determined by the plane-association module 680, or a positional determination module 682.

Figure 10:
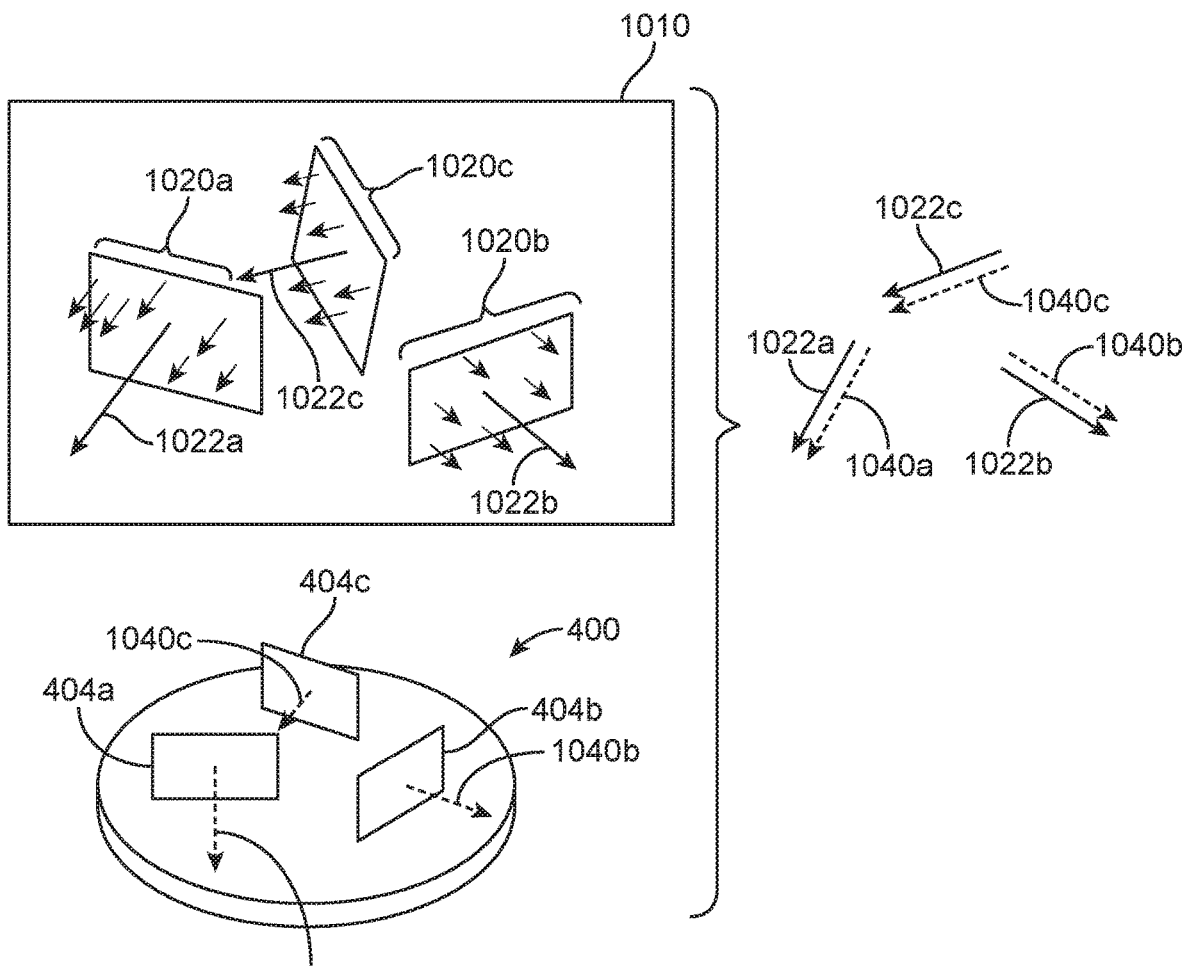
FIG. 10 illustrates a concept of matching detected planes with tool-planes.

The above concept is illustrated in FIG. 10. As shown in the figure, the depth image 1010 from the depth sensing camera 130 captures a "depth" scene. Each pixel in the depth image 1010 has a value representing a distance from a certain reference location (e.g., the camera, a detector in the camera, etc.). The plane detection module 654 detects a plurality of sub-planes by analyzing the depth image 101 using a moving window, as similarly discussed with reference to FIG. 9B. Each sub-plane is represented by its corresponding normal 1020 in the figure. In the illustrated example, there is a first group of normals 1020a having approximately the same first orientation. There is also a second group of normal 1020b having approximately the same second orientation. There is also a third group of normals 1020c having approximately the same third orientation. The histogram module 662 forms a histogram of the coefficients for the sub-planes, and the peak detection module 664 identifies three peaks in the histogram corresponding to the three detected planar surfaces in the depth image 1010. Because there is a relatively larger count of the normals in the three illustrated orientations, the histogram formed will have three corresponding peaks indicating that the depth image 1010 has three rectilinear planar surfaces. In some cases, the plane determination module 652 may determine a first average or median normal 1022a using the first set of normals 1020a for the first group of sub-planes, a second average or median normal 1022b using the second set of normals 1020b for the second group of sub-planes, and a third average or median normal 1022c using the third set of normals 1020c for the third group of sub-planes. As shown in FIG. 10, the plane-association module 680 is configured to match the determined planes (represented as normals 1022a-1022c) with corresponding tool-planes (represented as normals 1040a-1040c) of the planar structures 404a-404c at the marker block 400. The matching of the determined planes from the depth image 1010 with the tool-planes associated with the marker block 400 can be achieved by finding a position and orientation of the marker block 400 that matches the determined planes. Thus, as a result of the matching, a position and orientation of the marker block 400 will be obtained. When a match has been found, the normals 1022a-1022c will match the normals 1040a-1040c of the marker block 400. In the illustrated example, the determined plane with normal 1022a is associated with the tool plane with normal 1040a of the first planar structure 404a, the determined plane with normal 1022b is associated with the tool plane with normal 1040b of the second planar structure 404b, and the determined plane with normal 1022c is associated with the tool plane with normal 1040c of the third planar structure 404c.

In some cases, the plane-association module 680 is configured to perform the associating by performing a direct linear transform. In other cases, the plane-association module 680 may be configured to perform a Gauss iterative method to associate the planes determined by the plane determination module 652 with the respective tool-planes. Other techniques may be used by the plane-association module 680 in other embodiments.

Returning to FIG. 6A, after the position and orientation of the marker block 400 has been determined, positional information of the depth sensing camera 130 can then be determined (item 608). As used in this specification, the term "positional information" refers to position (e.g., x, y, z coordinate), orientation, or both. In some cases, the positional determination unit 682 in the system 650 may be configured to determine the positional information (e.g., position and/or orientation) of the depth sensing camera 130 based on an output (e.g., plane association information, positional information of marker block 400, etc.) from the plane-association module 680.

Various techniques may be employed to use the position of the marker block 400 to determine the position of the camera. In one technique, the position of the marker block 400 relative to a certain coordinate system is predetermined (known). In some embodiments, the marker block 400 is aligned to the machine isocenter such that its position and orientation relative to the isocenter is known precisely. For example, a user may line up certain features of the block to room lasers. In other embodiments, the user may line up the marker block with the lasers, and then translate the marker block a known distance (e.g., using the couch motors). Accordingly, the position of the marker block 400 (which may or may not be at the isocenter) is predetermined. Then the position of the marker block 400 relative to the camera 130 (the relative positioning) is combined with the known position of the marker block 400 (with respect to the known coordinate system) to obtain the position of the camera 130 relative to such coordinate system. For example, the combining of the two positions to obtain the resulting position may be accomplished by performing a matrix multiplication.

In the above embodiments, the system 650 is described as calibrating one depth sensing camera 130. In other embodiments, the same technique may be employed to determine positional information for multiple depth sensing cameras 130.

After the positional information of the depth sensing cameras 130 is determined, the positional information may be stored in a non-transitory medium for later use. Additionally or alternatively, the positional information may be displayed in a screen for presentation to a user.

For example, after the depth sensing cameras 130 are calibrated using the technique described herein, the collision avoidance system 100 may then use the positional information of the depth sensing cameras 130 during a medical procedure. During use of the collision avoidance system 100, the patient 20 is first positioned on the patient support 14 of the radiation treatment system 10. This may be performed during a treatment session after and/or during a patient setup procedure. The cameras 130 view the patient, and are then used to generate depth images. As used in this specification, the term "image" may refer to any group of data (e.g., depth values), which may or may not be displayed in image form. For example, the data may be stored in a non-transitory medium, and/or may be processed by the processing unit 140 without being displayed to a user for viewing. The depth images include information regarding a surface of the patient. In particular, the depth images will indicate a surface profile of the surface of the patient. As used in this specification, the term "surface" of the patient 20 is not limited to a skin surface of the patient 20, and may refer to other object(s) that is coupled to, or extends from, the patient. For example, the surface of the patient 20 may be the surface of a gown being worn by the patient 20, the surface of a cloth being worn by the patient 20, a blanket covering the patient 20, a towel covering the patient, a facemask, a goggle, a glasses, a breathing device, a catheter or a tube connected to the patient 20, etc. The surface profile of the patient may then be used by the processing unit 140 to determine whether there is any imminent collision that may happen. If so, the processing unit 140 may then generate a signal to stop an operation of the radiation treatment system 10. In some cases, the processing unit 140 receives a sequence of depth images in real time, and analyzes those images to see if there is a possible collision that may be about to happen. Alternatively or additionally, before the treatment process begins, the processing unit 140 may perform a virtual run of the treatment. In particular, the processing unit 140 may obtain information regarding the geometry (e.g., size, shape, degrees of movement, trajectory, etc.) of the various treatment components, and performs a simulation of the treatment by virtually (e.g., mathematically) moving the various components to see if any of the components may collide with the surface profile of the patient.

The camera calibration technique described herein is advantageous because it allows a depth camera's six degree of freedom (DOF) to be determined. The technique will work even if a part of a planar structure 404 at the marker block 400 is obstructed or cannot be detected. This is because as long as a portion of a planar structure 404 can be detected, the system 650 can associate the detected plane with one of the tool-plane of the corresponding planar structure 404 at the marker block 400. Also, the camera calibration technique described herein is advantageous because it does not require use of optical reflective markers.

In some embodiments, the method of calibrating the depth sensing camera 130 may optionally further include determining a corner of a marker block. For example, in some cases, at least three planar structures 404 of the marker block 400 may intersect each other to form a corner. In such cases, the system 650 may optionally further include a corner determination module configured to analyze at least three planes determined by the plane determination module 652 in order to find an intersection point of the three planes. In one implementation coefficients of the planes may be used by the corner determination module to calculate the intersection point of the planes. The intersection point represents the corner formed by the planar structures 404 of the marker block. The above feature is advantageous because it allows using point-based estimation for camera calibration.

In the above embodiments, the camera calibration technique is described as using the marker block 400 with a plurality of planar structures 404 attached thereto. In other embodiments, the marker block 400 may not be required. Instead, the calibration technique may use one or more structures (e.g., one or more rectilinear planar structures) at the patient support 14, or one or more structures (e.g., one or more rectilinear planar structures) attached to the patient support 14. For example, in one implementation, a planar structure may be attached to the patient support 14. The depth camera 130 is then used to detect a depth scene (provision a first depth image) while the planar structure is at a first position. The system 650 then processes the first depth image to determine a first plane for the surface of the planar structure while the planar structure is at the first position. Next, the patient support 14 is then positioned to move the planar structure. For example, the patient support 14 may be translated, rotated, or both, to thereby place the planar structure at a second position that is different from the first position. The relative position between the second position and the first position is predetermined (known). The depth camera 130 is then used to detect a depth scene (provision a second depth image) while the planar structure is at the second position. The system 650 then processes the second depth image to determine a second plane for the surface of the planar structure while the planar structure is at the second position. Positional information regarding the first and second determined planes may then be combined to obtain an information set representing different detected planes as though they were detected simultaneously (although they are really detected separately in time corresponding with a single tool plane at different positions). Accordingly, in such technique, the movement of the planar structure provides a first tool-plane when the planar structure is at the first position, and a second tool-plane when the planar structure is at the second position. In other embodiments, the above technique may be repeated to move the planar structure to a third position, a fourth position, etc., wherein each of the positions is different from each other.

In addition, in some embodiments, a two dimensional optical image may be obtained to assist the system 650 in identifying surfaces of interest. For example, a correspondence between the two dimensional optical image and the 3D point cloud data from the depth image may be established on a pixel-by-pixel basis. Also, information (such as grayscale, color, edge, shape, dimension, etc., or a combination of these properties) not present in the 3D point cloud information may be obtained from the two dimensional optical image, and may be used by the system 650 to identify surfaces.

In some embodiments, the system 650 may also include a user interface. The user interface may include any user input device, such as a keyboard, a mouse, a touch pad, a button, a knob, etc., for allowing a user to enter input to the system 650. The user input may be one or more input for identifying surfaces of different objects (e.g., planar structures 404, patient 20, patient support 14, gantry 12, imager 80, kV imager, etc., or any combination of the foregoing). In further embodiments, the user input may be a command to re-profile the marker block 400.

In some embodiments, the user interface may also include a screen for displaying information to a user. For example, the user interface may provide graphics indicating detected surfaces of the planar structures 404. In addition, the user interface may display an actual optical image of the marker block 400. Such display may be in a side-by-side configuration with respect to a graphical image showing the detected surfaces. Furthermore, in some cases, the user interface may display vectors representing normals of the sub-planes (like those shown in FIGS. 9B and 10), and/or the primary vectors representing the overall normals 1022 for the respective detected planar surfaces corresponding with the planar structures 404 like those shown in FIG. 9B). In addition, the user interface may display the normals 1022 of the detected planes together with normals 1040 of the planar structures 404 having known positional relationship with respect to each other, like that shown on the right side of FIG. 9B.

Figure 11:
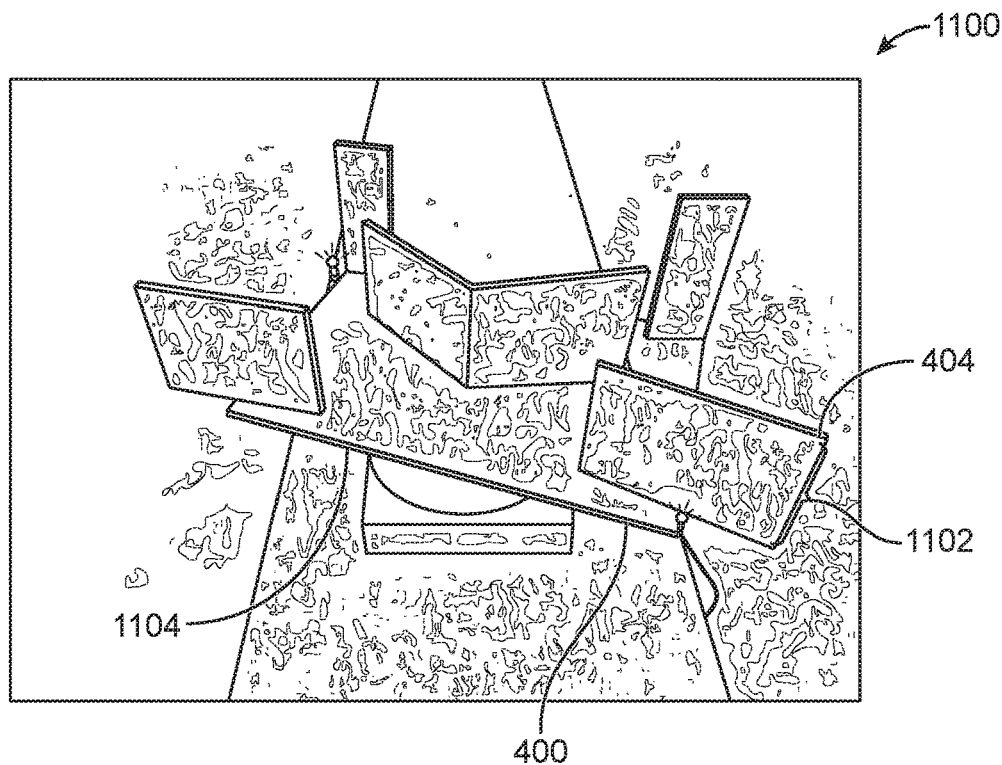
FIG. 11 illustrates detected planes superimposed with an image of planar structures having tool-planes.

In addition, in some cases, the detected planes may be presented together with an image of the marker block 400 in a user interface to show the correspondence between the detected planes and the tool-planes of the planar structures 404 at the marker block 400. For example, the detected planes may be superimposed onto the image of the marker block 400. FIG. 11 illustrates a display that includes an image 1102 of the detected planes superimposed onto an image 1104 of the marker block 400. A user may view such display and readily determine whether the detected planes desirably match the tool-planes of the planar structures 404 at the marker block 400.

Also, in some cases, the system 650 may also include three-dimensional rendering algorithms for rendering surfaces in a way suitable for visual presentation. For example, the three dimensional rendering algorithm may down-sample, up-sample, perform surface meshing, etc.

In the above embodiments, the system 650 processes the depth image to identify surfaces of interest. In some cases, this may be performed automatically. In other cases, a user may provide input to the system 650 to identify the different surfaces that are of interest (e.g., surfaces of the planar structures 404). In one implementation, each camera 130 may have optical imaging capability (in addition to depth imaging), and may provide an optical image for display on a screen. The user may view the optical image together with the depth image, in a side-by-side configuration or an overlay configuration, and may then identify different surfaces. For example, the user may enter an input to identify one or more surfaces that correspond with the planar structures 404 of the marker block 400.

In some embodiments, the depth sensing camera 130 may have the ability to acquire optical images (e.g., infrared or visible images), simultaneously in addition to depth images. In other embodiments, there may be two separate cameras, one capturing depth images and the other capturing optical images. If depth and optical images are both acquired during the procedure, the processing unit 140 may display both images next to each other on the monitor 56, or superimpose the two images on top of each other, to show how the depth image corresponds with the optical image. Also, in some embodiments, the processing unit 140 may perform analysis using optical images to identify surfaces for the various objects of interest (e.g., planar structures 404). In one or more embodiments, the depth image and the optical image may be superimposed/overlaid to obtain a composite image that shows both depth and visible image.

In addition, in other embodiments, the cameras 130 may be any time-of-flight (TOF) cameras, such as those that use infrared, ultrasound, etc. In further embodiments, the cameras 130 may be configured to use structured light to generate images. Also, in other embodiments, the cameras 130 may be stereoscopic imaging devices.

Furthermore, it should be noted that the cameras 130 do not need to be mounted to a stationary object, and may instead be mounted on moving object(s). For example, the cameras 130 may be mounted to a moving gantry, to a patient support, and/or to any other moving component(s) of a medical device (e.g., a treatment machine, or an imaging machine).

Figure 12:
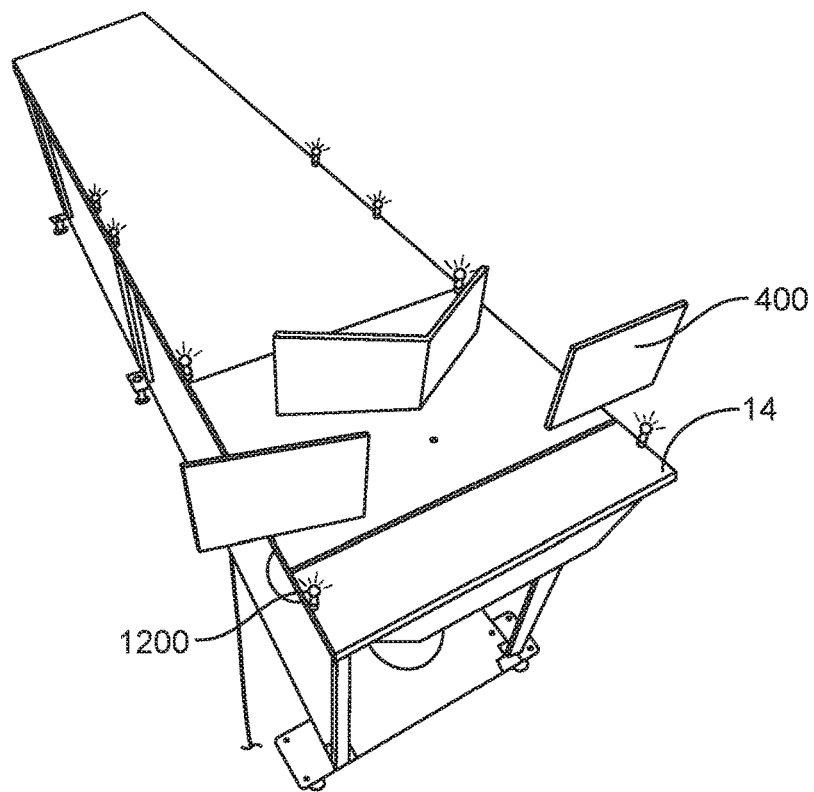
FIG. 12 illustrates a patient support with optical markers and the marker block of FIG. 4.

In any of the embodiments described herein, the marker block 400 and the depth camera calibration technique may be employed together with optical marker(s) and optical camera calibration. FIG. 12 illustrates a setup that includes a plurality of optical markers 1200 attached to the patient support 14. The setup also includes the marker block 400 attached to the patient support 14. During use, the optical markers 1200 may be detected by an optical camera, while the marker block 400 may be detected by the depth sensing camera 130. The relative positions between the optical markers 1200 are known, and therefore they can be utilized by a processing unit to determine the position and/or orientation of the optical camera that is viewing these markers 1200. Similarly, the detected planes of the marker block 400 are used by the processing unit to determine the position and/or orientation of the depth sensing camera 130. In some cases, the optical camera and the depth sensing camera 130 may be integrated into a single camera unit. In other cases, the optical camera and the depth sensing camera 130 may be separate cameras that are spaced apart from each other. Also, in other embodiments, instead of securing the optical markers 1200 to the patient support 14 directly, the optical markers 1200 may be secured to the marker block 400. For example, the marker block 400 may optionally include three or more (e.g., four, five, six, etc.) optical markers for allowing detection by the optical camera. The optical markers may be reflective markers in some embodiments.

In the above example of FIG. 1, the collision avoidance system 100 includes two depth cameras 130 positioned to view opposite sides of the patient 20. In particular, there is a first depth camera 130 positioned to view the patient 20 from his/her right side, and a second depth camera 130 positioned to view the patient 20 from his/her left side. In another example, there may be a first camera 130 positioned to view the patient 20 from above his/her head towards a direction of the feet, and a second camera 130 positioned to view the patient 20 from below his/her feet towards a direction of the head. Having two opposite cameras 130 is advantageous because it allows a substantially complete (e.g., 70% or greater, such as 80%, and more preferably 90%) surface of the patient 20 to be captured by the combination of the depth cameras 130. In some embodiments, the processing unit 140 may be configured to receive a first depth image from the first depth camera 130, and to receive a second depth image from the second depth camera 130. Because the relative position between the two depth cameras 130 is known, the processing unit 140 may use this positional information to perform coordinate transformation so that the surfaces of the patient 20 from the two depth images may be combined to form a continuous surface.

In further embodiments, the collision avoidance system 100 includes more than two depth cameras 130 (e.g., three cameras 130, four cameras 130, etc.). In such cases, the surface model may be formed by combining point clouds from the different cameras 130.

Figure 13:
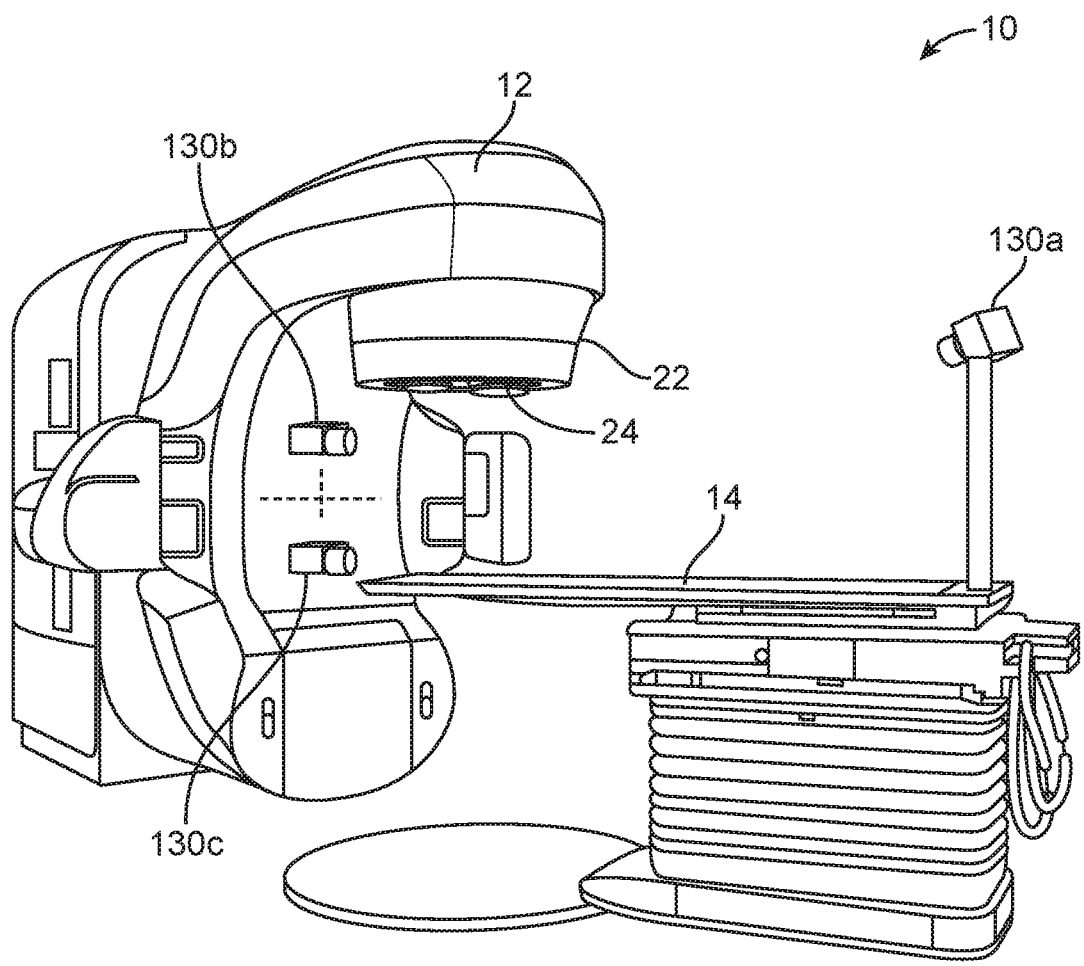
FIG. 13 illustrates placement of cameras in accordance with some embodiments.

FIG. 13 illustrates a camera system setup in accordance with some embodiments. As shown in the figure, the camera system setup is being implemented in a radiation system 10 (like that shown in FIG. 1). A first depth sensing camera 130a is mounted to the patient support 14 at one end of the patient support 14. A second depth sensing camera 130b and a third depth sensing camera 130c are mounted to the gantry 12. The marker block 400 and the camera calibration technique described herein may be used to determine the position and/or orientation of each of the three depth sensing cameras 130a-130c. In some cases, one or more of the cameras 130a-130c may optionally include optical sensing capability. During use, the cameras 130a-130c provide output for allowing a processing unit to form a "depth" scene, which can be analyzed to determine whether there is any imminent collision that may happen.

It should be noted that a plane can be represented by its normal. Thus, any of the features and functions described herein with respect to a "plan" may be achieved using its corresponding normal.

Also, in the above embodiments, the camera calibration technique is described with reference to using planar structure(s) 404, and detecting rectilinear planes in a depth image. In other embodiments, the calibration technique described herein may use non-rectilinear surface(s) of a marker block. For example, in other embodiments, the marker block 400 may have a curvilinear surface with known shape profile. During the calibration procedure, the system 650 detects sub-planes in a depth image, and determines whether the detected sub-planes match with the known shape profile of a surface of a marker block 400. Accordingly, the one or more determined planes described herein may correspond with a part of a curvilinear surface of a curvilinear structure at the marker block 400.

Although the above embodiments have been described with reference to calibrating depth camera(s) 130 that is used with a radiation treatment system, in other embodiments, the system and technique described herein may be used to calibrate depth camera(s) being used with other types of medical devices. For example, in other embodiments, the system and technique described herein may be used to calibrate depth camera(s) being used with a non-radiation treatment machine, such as an ultrasound treatment machine, a RF medical device, etc. Also, in other embodiments, the system and technique described herein may be used to calibrate depth camera(s) being used with a non-treatment machine, such as an imaging device (e.g., a CT machine, a x-ray, a fluoroscopic machine, etc.).

Specialized Processing System

Figure 14:
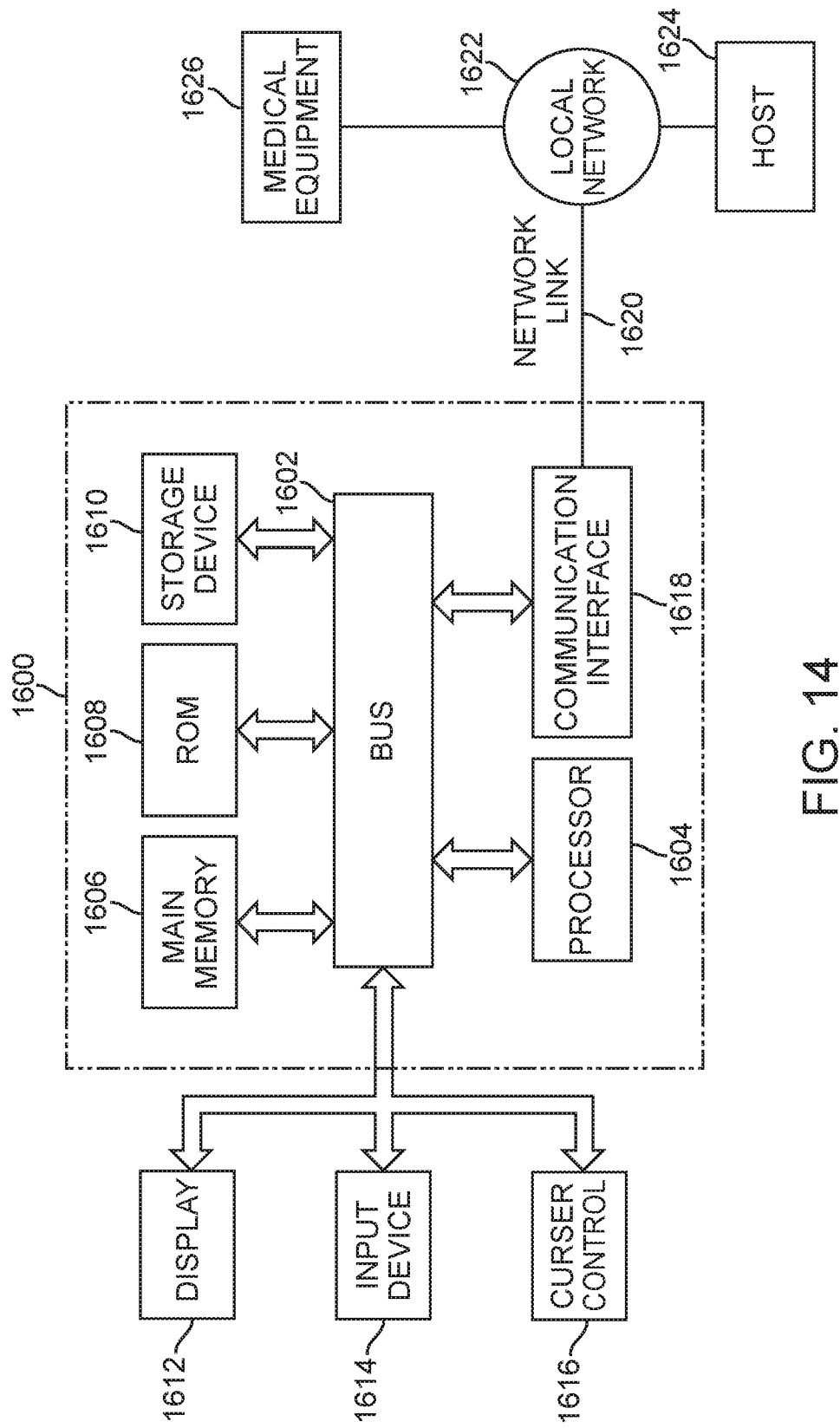
FIG. 14 illustrates a computer system with which embodiments described herein may be implemented.

FIG. 14 is a block diagram illustrating an embodiment of a specialized processing system 1600 that can be used to implement various embodiments described herein. For example, the processing system 1600 may be configured to implement the method of FIG. 6A in accordance with some embodiments. Also, in some embodiments, the processing system 1600 may be used to implement the processing unit 140 of FIG. 2 and/or the processing unit 54 of FIG. 1. The processing system 1600 may also be used to implement the system 650 of FIG. 6B, or any of the components 651, 654, 662, 664, 680, 682 of the system 650 of FIG. 6B. The processing system 1600 may also be an example of any processor described herein.

Processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processor system 1600 may be coupled via the bus 1602 to a display 167, such as a cathode ray tube (CRT), for displaying information to a user. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk of a remote computer. The remote computer can load the instructions into its dynamic memory and send the instructions over a telephone line using a modem. A modem local to the processing system 1600 can receive the data on the telephone line and use an infrared transmitter to convert the data to an infrared signal. An infrared detector coupled to the bus 1602 can receive the data carried in the infrared signal and place the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card or a modem to provide a data communication connection to a corresponding type of telephone line. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626 such as a radiation beam source or a switch operatively coupled to a radiation beam source. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A system for determining positional information of a camera, comprising:
  a plane determination module configured to determine a first plane and a second plane based on a depth image;
  a plane-association module configured to associate the first plane determined by the plane determination module with a first tool-plane, and to associate the second plane determined by the plane determination module with a second tool-plane, the first and second tool-planes having known positional relationship with respect to each other; and
  a positional determination unit configured to determine the positional information of the camera based on an output from the plane-association module;

wherein the plane determination module comprises a plane detection module configured to detect a plurality of sub-planes, and a histogram module configured to form a histogram of coefficients for the sub-planes.

2. The system of claim 1, further comprising a non-transitory medium for storing the depth image and/or data derived from the depth image.

3. The system of claim 1, wherein the plane determination module further comprises a peak identification module configured to identify a first peak and a second peak in the histogram, the first peak corresponding with the first plane, the second peak corresponding with the second plane.

4. The system of claim 3, wherein the peak identification module is also configured to identify a third peak in the histogram, the third peak corresponding with a third plane.

5. The system of claim 1, wherein the plane determination module is configured to determine the first plane using a principal component analysis or a pseudo-inverse method.

6. The system of claim 1, wherein the plane-association module is configured to perform a direct linear transform or a Gauss iterative method.

7. The system of claim 1, wherein the plane determination module is also configured to determine a third plane, and wherein the system further comprises a corner detection module configured to determine an intersection of the first, second, and third planes.

8. The system of claim 1, wherein the positional information comprises a coordinate of the camera, an orientation of the camera, or a combination of both.

9. The system of claim 1, wherein the camera is attached to a moving part of a medical device.

10. A method for determining positional information of a camera, comprising:
    determining, using a plane determination module, a first plane and a second plane based on a depth image;
    associating, using a plane-association module, the first plane determined by the plane determination module with a first tool-plane;
    associating the second plane determined by the plane determination module with a second tool-plane, the first and second tool-planes having known positional relationship with respect to each other; and
    determining, using a positional determination unit, the positional information of the camera based on an output from the plane-association module;
    wherein the method further comprises detecting a plurality of sub-planes; and
    forming a histogram of coefficients for the sub-planes.

11. The method of claim 10, further comprising storing the depth image and/or data derived from the depth image in a non-transitory medium.

12. The method of claim 10, further comprising identifying a first peak and a second peak in the histogram, the first peak corresponding with the first plane, the second peak corresponding with the second plane.

13. The method of claim 12, further comprising identifying a third peak in the histogram, the third peak corresponding with a third plane.

14. The method of claim 10, wherein the first plane is determined using a principal component analysis or a pseudo-inverse method.

15. The method of claim 10, wherein the acts of associating comprise performing a direct linear transform or a Gauss iterative method.

16. The method of claim 10, further comprising determining a third plane, wherein the method further comprises determining an intersection of the first, second, and third planes.

17. The method of claim 10, wherein the positional information comprises a coordinate of the camera, an orientation of the camera, or a combination of both.

18. The method of claim 10, wherein the first tool-plane corresponds with a first planar structure, and the second tool plane corresponds with a second planar structure, and wherein the first planar structure and the second planar structure are mounted to a supporting base.

19. The method of claim 10, wherein the first tool-plane corresponds with a planar structure when the planar structure is at a first position, and the second tool-plane corresponds with the planar structure when the planar structure is at a second position.

20. The method of claim 19, further comprising moving the planar structure from the first position to the second position.

21. The method of claim 20, wherein the planar structure is coupled to a patient support, and wherein the act of moving the planar structure comprises translating the patient support, rotating the patient support, or both.

22. The method of claim 10, the camera is attached to a moving part of a medical device.

23. A marker block for use with a depth sensing camera, comprising:
    a supporting base;
    a first planar structure connected to the supporting base;
    a second planar structure connected to the supporting base, wherein the second planar structure is spaced apart from the first planar structure; and
    a third planar structure connected to the supporting base;
    wherein the first planar structure has a first orientation, the second planar structure has a second orientation, and the third planar structure has a third orientation, the first, second, and third orientations being different from each other; and
    wherein the supporting base to which the first, second, and third planar structures are connected, has a perimeter defining a complete boundary of a flat bottom surface of the base, and wherein at least a majority of the flat bottom surface is configured for placement onto, and to be supported by, a planar surface of an inanimate supporting structure.

24. The marker block of claim 23, wherein the third planar structure is spaced apart from the first and second planar structures.

25. The marker block of claim 23, further comprising a fourth planar structure, wherein the fourth planar structure has a fourth orientation that is different from the first, second, and third orientations.

26. The marker block of claim 23, wherein the first planar structure has a first edge, and the second planar structure has a second edge that is spaced apart from the first edge of the first planar structure.

27. The marker block of claim 23, wherein the first planar structure has a detection surface configured for detection by the depth sensing camera, the detection surface having an area that is at least 1 square foot.

28. The marker block of claim 23, wherein the first planar structure and the second planar structure are both coupled to a planar surface of the supporting base, and are spaced apart from each other by a distance that is at least 12 inches.

29. The system of claim 1, further comprising a marker block for viewing by the camera, the marker block comprising:
- a supporting base;
- a first planar structure connected to the supporting base;
- a second planar structure connected to the supporting base, wherein the second planar structure is spaced apart from the first planar structure; and
- a third planar structure connected to the supporting base;
- wherein the first planar structure has a first orientation, the second planar structure has a second orientation, and the third planar structure has a third orientation, the first, second, and third orientations being different from each other; and
- wherein the camera is configured to capture an image of the marker block.

30. A medical system comprising the marker block of claim 23, and the inanimate supporting structure, wherein the inanimate supporting structure comprises a patient support configured to support a weight of the patient, and wherein the marker block is located on the planar surface of the patient support.

* * * * *